May 13, 1958      L. C. EBEL      2,834,828
ELECTRIC CABLE

Filed Nov. 19, 1954

*INVENTOR.*
LAWRENCE C. EBEL
BY

ATTORNEYS

United States Patent Office 2,834,828
Patented May 13, 1958

2,834,828

ELECTRIC CABLE

Lawrence C. Ebel, Hastings-on-Hudson, N. Y., assignor to Anaconda Wire and Cable Company, a corporation of Delaware Application November 19, 1954, Serial No. 469,961

7 Claims. (Cl. 174—102)

This invention relates to high voltage electric power cable. More particularly, it relates to electric power cable the insulation of which has a high coefficient of thermal expansion, and to a metallic shield construction for the insulation of such cable.

Electric power cables designed to carry large currents at high voltages ordinarily comprise one or more metallic conductors each surrounded by a relatively thick layer of high quality insulation. To protect the cable from electrical breakdown due to localized over-stressing of the dielectric, the cable is ordinarily provided with a metallic shield surrounding and in contact with the outer surface of the insulation. The metal shield is usually applied around the cable insulation in the form of a helical wrapping of a relatively inelastic metal tape. It is the function of the metal shield to maintain the outer surface of the insulation at a substantially uniform potential throughout its length by conducting from this surface any charges that may tend to build up and accumulate thereon. To perform this function properly it is essential that the metal shield be in good electrical contact with the outer surface of the insulation throughout the entire length of the cable.

The insulation of high voltage power cable itself must meet exacting requirements. For example, it should have excellent dielectric properties, ozone resistance, moisture resistance and chemical stability. Among the potentially most satisfactory insulating materials for such cable are certain of the recently developed thermoplastic materials and synthetic rubbers such as polyethylene and butyl rubber. Although these materials possess excellent physical, chemical and electrical properties for an insulating material for high voltage power cables, their use for this purpose has been limited due to their relatively high coefficients of thermal expansion. For example, the volumetric expansion of polyethylene is approximately 4% when its temperature increases from 20° C. to 80° C. In power cables a range of operating temperatures of this magnitude is not at all unusual. As a result, difficulty has been encountered when polyethylene and other such insulating materials having relatively high coefficients of thermal expansion have been employed as insulation in shielded power cables. When the temperature of such an insulated power cable rises while in use, the insulation expands and imposes so great a hoop stress on the surrounding inelastic metal shield tape as to cause it to rupture, or to be over-stressed so that it becomes loose, thereby impairing or even destroying the shielding effect of the metal shield tape.

I have now devised a metal shield tape for power cables insulated with a material having a high coefficient of thermal expansion that permits cable shielded with my shield tape to be used within the usual range of operating temperatures for such cable without damage to the metallic shield. The shield tape that I have devised comprises a layer of thin metal tape securely bonded to a layer of electrically conductive elastic material. The layer of metal tape is formed with a plurality of laterally extending expansion slits longitudinally spaced along the length of the metal tape. The expansion slits occur in repeating groups of slits, each group comprising at least two laterally overlapping longitudinally spaced slits which individually extend laterally less than completely across the metal tape and which together extend laterally completely across the metal tape. The metal shield tape of my invention is applied helically around the cable insulation having a high coefficient of thermal expansion. The shield tape may be intercalated with a tape of electrically conductive elastic material to provide greater flexibility of the cable while sacrificing none of the protection afforded by the shield tape. Other layers of insulating and semi-conductive material may be incorporated in the cable structure as dictated by the specific use to which the power cable is to be put. A protective outer jacket of a material such as neoprene or lead surrounds the internal components of the cable of my invention.

My invention is described in greater detail hereinbelow with reference to the drawings of which:

Figure 1:
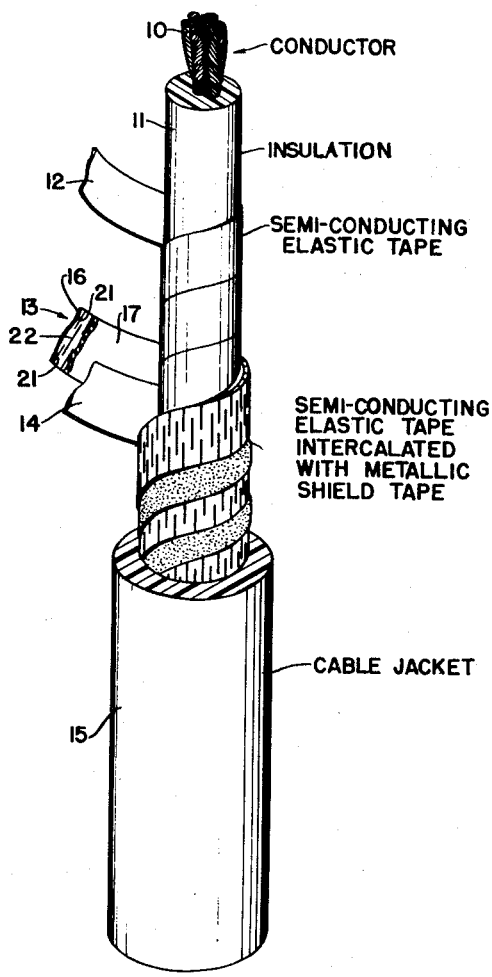
Fig. 1 is a perspective view of a typical cable construction employing the shield tape of my invention.

A typical cable construction embodying my invention comprises a metal conductor 10, a relatively thick layer of insulation 11 having a high coefficient of thermal expansion surrounding the conductor 10, a tape 12 of electrically conductive elastic material surrounding the layer of insulation 11, a helically wound layer of shield tape 13 constructed pursuant to my invention, a tape 14 of electrically conductive elastic material intercalated with the shield tape 13, and an outer protective jacket surrounding the internal components of the cable. Although a single conductor cable is shown for purposes of illustration in the accompanying drawing, it should be understood that my invention is equally applicable to a cable having two or more conductors, each of which may be separately insulated by an individual layer of insulation, or two or more of which conductors may be embedded in but held spaced apart by a single body of insulation.

The layer of insulating material 11 surrounding the metal conductor may comprise any material having dielectric and other properties making it suitable for use as insulation in a high voltage power cable. In the cable construction to which my invention relates, it is contemplated that the insulating material will have a high coefficient of thermal expansion. By the term "high coefficient of thermal expansion" I mean a coefficient of thermal expansion of the order of that possessed by polyethylene or butyl rubber as contrasted with the relatively much lower coefficient of thermal expansion possessed by insulating materials such as oil impregnated paper.

The tape 12 of elastic material is advantageously wrapped helically directly about the insulation 11. It preferably is relatively thin and preferably is applied with a slight overlap at its edges in order to be sure that the insulation 11 is completely covered thereby. Of course, the tape 12 is very flexible and is itself capable of yielding to such thermal expansion of the insulation as occurs during normal use of the cable. Elastic materials suitable for use as the tape 12 include fibrous materials such as bias cut cloth tape and crepe paper, and plastic materials such as natural rubber, Buna S, chloroprene, butyl rubber, and other similar substances. It is generally preferable that these elastic materials be made electrically conductive. For this purpose, the elastic material may be compounded to contain carbon black, graphite, metal powder, or other finely divided electrical conductors, incorporated in sufficient amount and in such manner to give the elastic material the characteristics of a high resistance conductor. By making the tape 12 of electrically conducting elastic material, the development of small zones subjected to high electrical stress on the surface of the insulation of the cable are substantially eliminated. In place of the tape 12, an equivalent layer such as a thin extruded or otherwise applied layer of electrically conductive elastic material may be used. The layer of tape 12 or its equivalent is not itself an essential part of the cable of my invention, however, and in some cable constructions made according to the invention it may be omitted altogether.

Figure 3:
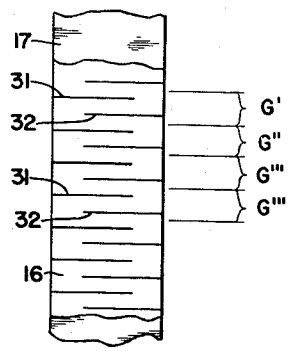
Fig. 3 is a view of another form of the shield tape of my invention.
Figure 2:
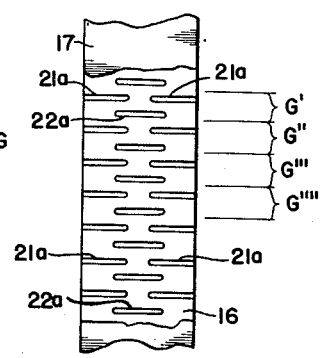
Fig. 2 is a view of one form of the shield tape of my invention.
Figure 4:
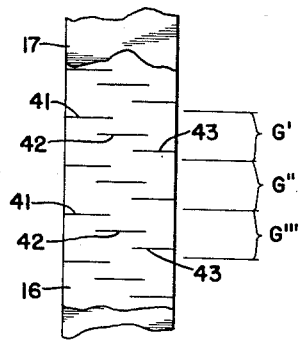
Fig. 4 is a view of still another form of the shield tape of my invention.

Surrounding the layer of insulation 11 and the tape 12 (if the tape 12 is incorporated in the cable structure) I provide the elastic shield tape 13 of my invention. The shield tape 13 is wrapped helically about the inner components of the cable structure in firm contact with the directly underlying layer thereof. The shield tape 13 comprises a layer of thin metal tape 16 securely bonded to a layer of electrically conductive eleastic material 17 by means of conventional metal to rubber adhesives or other techniques well known for this purpose. The metal tape 16, advantageously fabricated of thin gauge copper strip, is formed with a plurality of laterally extending expansion slits longitudinally spaced along the length of the metal tape. The lateral expansion slits occur in repeating groups of slits, each group comprising at least two laterally overlapping longitudinally spaced slits which individually extend laterally less than completely across the metal tape 16 and which together extend laterally completely across the tape 16. Specific forms of these repeating groups of expansion slits, which groups are indicated at G', G'', G''', etc. in Figs. 2 through 4, are described in greater detail hereinbelow.

The lateral expansion slits in the metal tape 16 are so disposed that they permit the shield tape 13 to stretch longitudinally an appreciable amount when the tape 13 is placed under tension without damage to the metal tape component thereof. Of course, the underlying elastic material 17 to which the metal tape 16 is bonded is also stretched longitudinally when the shield tape 13 is placed under tension and is slightly elongated. The elastic material 17 tends to return to its initial shape or dimensions when the tension on the shield tape 13 is released, thus recompacting the extended metal tape 16 and insuring that the shield tape 13 will remain in intimate contact with the underlying structure of the power cable of which it is a part.

The layer of electrically conductive elastic material 17 to which the metal tape 16 is bonded should have good elastic properties so that it can be elongated under tension and will return to its original shape or dimensions when the tension is released. Suitable elastic materials include natural rubber, Buna S rubber, butyl rubber, chloroprene and the like. The elastic material 17 is made electrically conductive by incorporating in the material composition sufficient carbon black, graphite powder, metal powder or the like to make the finished material a high resistance conductor or semi-conductor. To insure good electric contact between the layer of elastic material 17 and the metal tape 16, the metal to rubber adhesive employed to bond the two layers of the shield tape 13 together should also be made electrically conductive in the manner known in the cable manufacturing art.

The shield tape 13 may be applied helically about the cable insulation so that the edges of succeeding turns of the tape abut or overlap each other. Preferably, however, the tape 13 is applied to the cable insulation intercalated with a tape 14 of electrically conductive elastic material. The tape 14 is made of an electrically conductive elastic material such as that employed for the tape 12 of the cable structure. Preferably, the elastic properties of the tape 14 are substantially the same as those of the layer of elastic material 17 in the shield tape 13 so that no undue stresses will be imposed on the shield tape 13 as the cable insulation expands and contracts due to fluctuations in its operating temperature.

The cable is completed by an outer protective jacket 15 formed of a tough rubber-like composition such as polymerized chloroprene, or of a flexible metallic material such as lead.

The expansion slits characteristic of the shield tape 13 of my invention are formed in the metal tape 16 prior to its being bonded to the underlying layer of elastic material 17. The slits are formed in the metal tape 16 by any appropriate procedure such as by a punching or slitting operation. However the slits may be formed in the metal tape, it is important that the length of each slit be many times greater than the unexpanded width of the slit, it being apparent that a generally circular or oval opening formed in the metal tape 16 would not in any significant measure contribute to the ability of the tape to be elongated under tension without damage to the tape.

The laterally disposed expansion slits formed in the metal tape 16 may take a variety of forms or patterns of slits. I presently prefer to use the form or pattern of expansion slits shown in Fig. 1 of the drawing. In this tape construction each repeating group of slits comprises two edge slits 21 extending inwardly from opposite edges of the metal tape 16 toward but not into contact with each other, and a center slit 22 spaced longitudinally from the edge slits 21 and extending laterally from a point an appreciable distance inward of one edge of the metal tape 16 across the tape to a point an appreciable distance inward from the other edge of the metal tape. It is essential that the outermost portions of the center slit 22 overlap the innermost portions of the two edge slits 21 and, further, that the slits 21 and 22 individually extend laterally less than completely across the metal tape 16 and together extend laterally completely across the metal tape 16. A metal tape formed with repeating groups of expansion slits of the type described can be extended longitudinally an appreciable amount without damage to the essential structure of the metal tape. If means are provided for returning the expanded metal tape to its original condition the tape can' be expanded and contracted in the manner described substantially indefinitely without damage.

A modification of the preferred form of the expansion slits formed in the shield tape 13 of my invention is shown in Fig. 2 of the drawing. As in the shield tape construction of Fig. 1, the metal tape 16 is formed with repeating groups of expansion slits G', G'', G''', etc. Each group of expansion slits comprises two edge slits 21a extending inwardly from opposite edges of the metal tape 16 toward but not into contact with each other, and a center slit 22a spaced longitudinally from the edge slits 21a and extending laterally from a point an appreciable distance inward of one edge of the metal tape 16 across the tape to a point an appreciable distance inward from the other edge of the metal tape. The expansion slits 21a and 22a differ from the expansion slits 21 and 22 in that the former are open slots having small but appreciable width, whereas the latter in their unexpanded condition are closed slits having no width. The expansion slits of the modification of Fig. 2, however, are capable of being expanded longitudinally when the metal tape is placed under tension, thus permitting the metal tape to be stretched an appreciable amount without damage to the tape. These slits are to be clearly distinguished from perforations and other openings formed in the tape which would not contribute significantly to the ability of the metal tape 16 to be stretched without damage to its essential structure.

In the form of the shield tape of my invention shown in Fig. 3, each repeating group of expansion slits G', G'', G''', etc. comprises one edge slit 31 extending inwardly from one edge of the metal tape 16 part way across the tape, and a second edge slit 32 longitudinally spaced from the first edge slit and extending inwardly from the opposite edge of the metal tape 16 part way across the tape. Again, it is important that neither slit 31 or 32 extend individually completely across the metal tape 16, and that the adjacent ends of the slits 31 and 32 overlap each other as shown so that the slits together extend laterally completely across the metal tape 16.

In the form of the shield tape of my invention shown in Fig. 4, each repeating group of slits G′, G″, G‴, etc. comprises an edge slit 41 extending inwardly from one edge of the metal tape 16 part way across the tape, a center slit 42 spaced longitudinally from the edge slit 41 and extending laterally from a point an appreciable distance inward from one edge of the metal tape 16 part way across the tape to a point an appreciable distance inward of the other edge of the metal tape, and a second edge slit 43 spaced longitudinally from the center slit 42 and extending inwardly from the other edge of the metal tape 16 part way across the tape. The adjacent portions of the first edge strip 41 and the center slit 42, and the center slit 42 and the second edge slit 43, should overlap somewhat as shown in the drawing. Again it is important that the laterally disposed expansion slits 41, 42 and 43 of each group of slits individually extend laterally less than completely across the metal tape and together extend completely across the metal tape 16.

When incorporated in a high voltage power cable insulated with a material having a high coefficient of thermal expansion, my novel shield tape contacts the entire outer surface of the underlying cable structure smoothly and without a break throughout the full range of operating temperatures of the cable. As the cable warms up at the peak of its daily load cycle, the tape stretches slightly to accommodate the thermal expansion of the underlying insulation, the shield tape 13 shortening to its initial length as the cable cools and the underlying insulation contracts. Throughout the normal expansion and contraction cycle of the cable insulation, the shield tape 13 of my invention remains in good electrical contact with the underlying components of the cable thereby preventing the accumulation of excessive electrostatic charges on the outer surface of the insulation that might result in the electrical breakdown thereof. Accordingly, it will be seen that my novel shield tape, and the cable construction of which it forms a part, constitute an important contribution to the art to which my invention relates.

I claim:

1. An electric cable comprising a metallic conductor, a layer of insulation having a high coefficient of thermal expansion surrounding said conductor, and a shield tape surrounding said layer of insulation, said shield tape comprising a layer of thin metal tape securely bonded to a layer of elastic material, said thin metal tape being formed with repeating groups of laterally extending expansion slits longitudinally spaced along the length of the metal tape, each group of said expansion slits comprising at least two laterally overlapping longitudinally spaced slits which individually extend laterally only part way across the metal tape and which together extend laterally from edge to edge completely across the metal tape.

2. An electric cable comprising a metallic conductor, a layer of polyethylene insulation of substantial thickness surrounding said conductor, a layer of elastic material surrounding said polyethylene insulation, and a helically wound shield tape surrounding said layer of elastic material, said shield tape comprising a layer of thin metal tape securely bonded to a layer of elastic material, said metal tape being formed with a plurality of laterally extending expansion slits longitudinally spaced along the length of the metal tape, said expansion slits occurring in repeated groups of slits, each group of slits comprising at least two laterally overlapping longitudinally spaced slits which individually extend laterally less than completely across the metal tape and which together extend laterally from edge to edge completely across the metal tape.

3. An electric cable comprising a metallic conductor, a layer of insulation having a high coefficient of thermal expansion surrounding the said conductor, a layer of electrically conductive elastic material surrounding said layer of insulation, and a helically wound shield tape surrounding said layer of elastic material, said shield tape comprising a layer of a thin metal tape securely bonded to a layer of electrically conductive elastic material, said metal tape being formed with repeating groups of laterally extending expansion slits longitudinally spaced along the length of the metal tape, each group of said slits comprising at least two laterally overlapping longitudinally spaced slits which individually extend laterally less than completely across the metal tape and which together extend laterally from edge to edge completely across the metal tape.

4. An electric cable comprising a metallic conductor, a layer of insulation of substantial thickness and having a high coefficient of thermal expansion surrounding said conductor, and a shield tape intercalated with a tape of electrically conductive elastic material helically wound about and surrounding said layer of insulation, said shield tape comprising a layer of thin metal tape securely bonded to a layer of electrically conductive elastic material, said metal tape being formed with repeating groups of laterally extending expansion slits longitudinally spaced along the length of the metal tape, each group of said slits comprising at least two laterally overlapping longitudinally spaced slits which individually extend laterally less than completely across the metal tape and which together extend laterally from edge to edge completely across the metal tape.

5. An electric cable comprising a metallic conductor, a layer of insulation of substantial thickness and having a high coefficient of thermal expansion surrounding said conductor, a layer of electrically conductive elastic material surrounding said layer of insulation, and a shield tape intercalated with an electrically conductive elastic tape helically wound about and surrounding said layer of elastic meaterial, said shield tape comprising a layer of thin metal tape securely bonded to a layer of electrically conductive elastic material, said metal tape being formed with repeating groups of laterally extending expansion slits longitudinally spaced along the length of the metal tape, each group of said slits comprising at least two laterally overlapping longitudinally spaced slits which individually extend laterally less than completely across the metal tape and which together extend laterally from edge to edge completely across the metal tape.

6. A shield tape for the insulation of electric cable comprising a layer of thin metal tape securely bonded to a layer of electrically conductive elastic material, said metal tape being formed with a plurality of laterally extending expansion slits longitudinally spaced along the length of the metal tape, said expansion slits occurring in repeating groups of slits, each group of slits comprising at least two laterally overlapping longitudinally spaced slits which individually extend laterally less than completely across the metal tape and which together extend laterally from edge to edge completely across the metal tape.

7. A shield tape for the insulation of electric cable comprising a layer of a thin metal tape securely bonded to a layer of electrically conductive elastic material, said metal tape being formed with repeating groups of laterally extending expansion slits longitudinally spaced along the length of the metal tape, each group of slits comprising two edge slits extending inwardly from opposite edges of the metal tape toward but not into contact with each other and a center slit spaced longitudinally from said edge slits and extending laterally from a point an appreciable distance inward of one edge of the metal tape across the tape to a point an appreciable distance inward of the other edge of the metal tape, the outermost portions of the center slit overlapping the innermost portions of the two edge slits.

References Cited in the file of this patent

UNITED STATES PATENTS

| | | |
|---|---|---|
| 1,370,731 | Chase | Mar. 8, 1921 |
| 2,019,297 | Faucett | Oct. 29, 1935 |
| 2,049,073 | Morrison | July 28, 1936 |
| 2,633,440 | Scholl | Mar. 31, 1953 |